United States Patent [19]

Mansell

[11] Patent Number: 5,029,111
[45] Date of Patent: Jul. 2, 1991

[54] SHARED BIT-PLANE DISPLAY SYSTEM
[75] Inventor: Barry N. Mansell, Billerica, Mass.
[73] Assignee: Prime Computer, Inc., Prime Park, Mass.
[21] Appl. No.: 43,705
[22] Filed: Apr. 29, 1987
[51] Int. Cl.⁵ .......................................... G06F 15/40
[52] U.S. Cl. ................................. 364/521; 364/522; 364/238; 364/942.03; 340/798; 340/799
[58] Field of Search ............ 364/521, 522, 238, 260.7, 364/134, 942.1; 340/799, 798, 750, 825.07, 825.08, 802; 370/61, 77; 455/3

[56] References Cited
U.S. PATENT DOCUMENTS

| | | | |
|---|---|---|---|
| 3,988,728 | 10/1976 | Inoue et al. | 340/324 AD |
| 4,029,947 | 6/1977 | Evans et al. | 235/151 |
| 4,379,946 | 4/1983 | Mizuno et al. | 178/3 |
| 4,386,410 | 5/1983 | Pandya et al. | 364/518 |
| 4,475,104 | 10/1984 | Shen | 340/729 |
| 4,509,043 | 4/1985 | Mossaides | 340/721 |
| 4,524,440 | 6/1985 | Orsic | 370/54 |
| 4,539,587 | 9/1985 | Eby et al. | 358/107 |
| 4,550,315 | 10/1985 | Bass et al. | 340/703 |
| 4,653,020 | 3/1987 | Cheselka et al. | 364/900 |
| 4,658,249 | 4/1987 | Vogt | 340/825.63 |
| 4,667,305 | 5/1987 | Dill et al. | 364/900 |
| 4,691,295 | 9/1987 | Erwin et al. | 364/900 |
| 4,704,697 | 11/1987 | Kiremidjian et al. | 364/518 |
| 4,716,544 | 12/1987 | Bartley | 364/900 |
| 4,719,562 | 1/1988 | Bailly et al. | 364/200 |
| 4,742,347 | 5/1988 | Arismendi | 340/799 |
| 4,745,407 | 5/1988 | Costello | 340/799 |
| 4,760,388 | 7/1988 | Tatsumi et al. | 340/717 |
| 4,782,462 | 11/1988 | Kaplinsky et al. | 364/900 |
| 4,785,394 | 11/1988 | Fischer | 364/200 |
| 4,809,159 | 2/1989 | Sowa | 364/200 |
| 4,845,480 | 7/1989 | Satou | 340/717 |
| 4,847,757 | 7/1989 | Smith | 364/200 |
| 4,878,217 | 10/1989 | Nakamura et al. | 340/77 |
| 4,901,230 | 2/1990 | Chen et al. | 364/200 |
| 4,928,234 | 5/1990 | Kitamura et al. | 364/200 |
| 4,951,193 | 8/1990 | Muramatsu et al. | 364/200 |

Primary Examiner—Gary V. Harkcom
Assistant Examiner—Phu K. Nguyen
Attorney, Agent, or Firm—David G. Conlin; Robert M. Asher

[57] ABSTRACT

A multiuser display system in which the bit planes are shared by a plurality of user stations. A bus carries a superpixel containing bits from each of the bit planes in this system. Each user station is assigned particular bit planes and extracts the bits corresponding to the assigned bit planes from the superpixel. Double buffering within a window is made possible by providing two sets of bit plane identification registers.

11 Claims, 3 Drawing Sheets

FIG.4

SHARED BIT-PLANE DISPLAY SYSTEM

BACKGROUND OF THE INVENTION

This invention relates to a multiuser bit-mapped graphics system.

An architecture commonly used for color raster scan graphics display systems is a frame buffer with a color map. A terminal or work station will have a number of overlaying bit planes associated with it. A bit plane is conceptually a planar arrangement of memory cells with addressability equal to or greater than that of the display surface. Looking down through these planes provides a data word associated with a pixel (picture element). The assignment of these pixel data to actual display surface locations is often fixed, but some display systems allow some control here for improved dynamics. The pixel data word is usually translated by a color look-up table (CLT) to obtain the display appearance currently assigned to that particular data value.

In order to provide features such as fast window management, fast magnify, smooth roam, flexible bit-plane expansion and others, some systems are built with an increased complexity such as random access over the pixel data bus between the color look-up table and the bit planes. The required speed might be supported by a special wide pixel data bus transferring multiple pixels at a time. The use of random access and the required fast data rates of such systems limits the size of such a system to a single display or possibly a small number of displays at reduced addressability.

The straightforward approach to a multi-user graphic system is to have a plurality of display systems, one for each user. The display systems might be external or internal to the graphics host responsible for supplying image data for the bit planes, however, the systems each operate distinctly. Each system is assigned to a single user and has one identifiable set of hardware associated with it, the bit planes for each user being a part of that hardware. One disadvantage of this system is that each user must always have the maximum amount of hardware required for any application that would be run by that user.

SUMMARY OF THE INVENTION

The display system of the present invention includes a memory which stores a plurality of bit planes. Data are removed from the bit planes in the form of a superpixel which includes a bit from the same pixel location in each of the plurality of bit planes. A plurality of user stations are supported by this display system, each user station being assigned a sub-set of bit planes in the memory. Each user station has switching hardware to extract from the superpixel, and properly order, the bits which come from the bit planes assigned to that particular user station.

The present invention takes advantage of the fact that most of the time a user does not need the full color capability that some software applications require. For example, most design work today is done with wire frame images rather than shaded images. The present invention advantageously reduces the cost of providing full color capability in an individual office by sharing the system's bit planes among the individual users on an as-needed-basis. Since user stations are moving more and more into individual offices, it is desirable to provide full capability in the individual office. This is preferable to having a terminal room for full capability stations separate from the low functionality stations that might be used in an office.

The present invention further includes the option of providing each user station with a second bit-plane identifier so that it can be assigned two subsets of bit planes from the memory. These can be used for double-buffering which is useful for providing continuity to dynamic images in animation. The frames of the animation can be viewed by switching back and forth between sets of bit planes. While one set is being viewed the other set can be updated. By identifying a window area with one of the bit planes, this animation can be made to occur only within that window.

Other objects and advantages of the invention will become apparent during the following description of the presently preferred embodiment of the invention taken in conjunction with the drawings.

DETAILED DESCRIPTION OF THE PREFERRED EMBODIMENT

Figure 1:
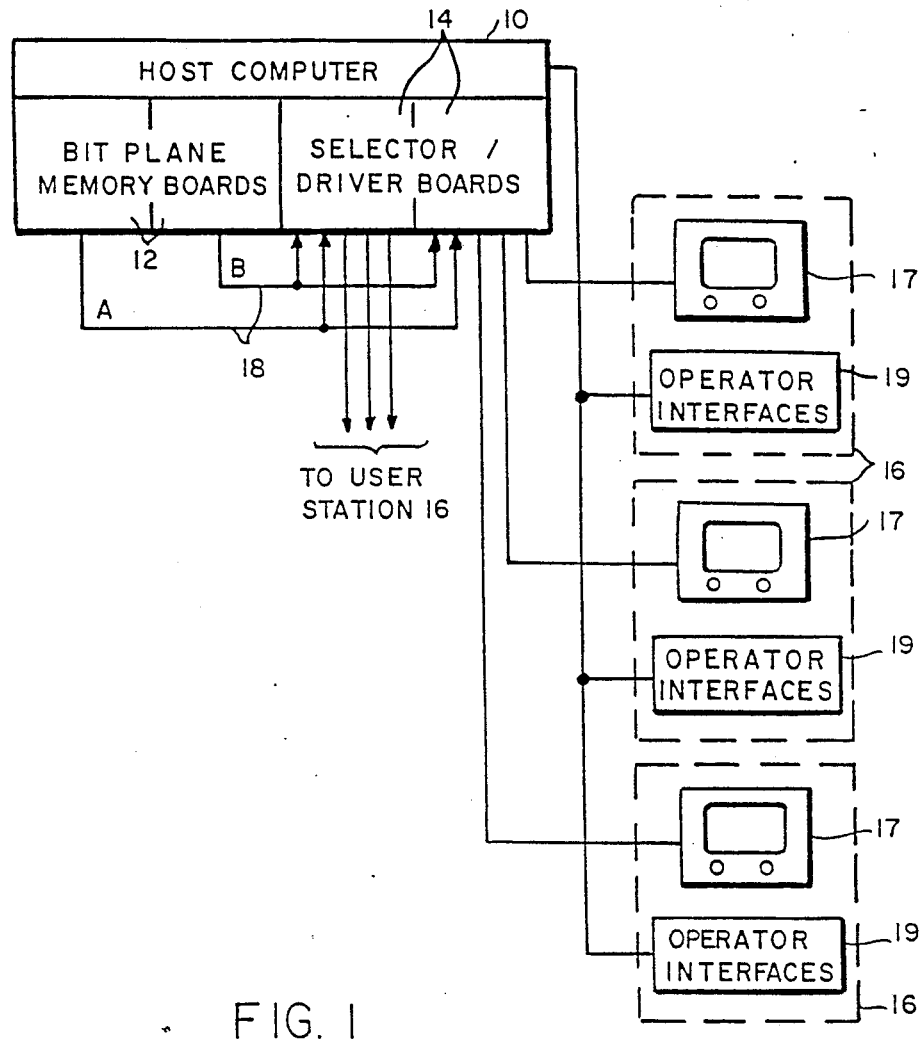
FIG. 1 is a schematic diagram of a display system of the invention.

Turning now to the drawings, FIG. 1 illustrates the overall arrangement of a multiuser display system with shared bit-planes. The system is controlled by a host computer 10. The display system is implemented by a combination of bit-plane memory boards 12 and selector driver boards 14. Each bit-plane memory board 12 stores up to 16 bit planes. Each selector driver board supplies the display data for three user stations 16. The presently preferred embodiment can handle a maximum of two bit-plane memory boards and two selector/driver boards 14. The bit-plane memory boards and the selector/driver boards interact over a pixel data bus 18. Each bit plane memory board is accessed by a 64 line pixel data bus 18. The total 128 line pixel data bus is provided to each of the selector/driver boards 14. A user station 16 is generally provided with a color monitor 17 and an operator interface 19. The operator interface 19 could be a keyboard, a mouse, a digitizing tablet or other conventional interface.

According to the present invention all of the user stations 16 share the bit planes on the bit-plane memory boards 12. In the preferred embodiment, 32 bit planes may be shared by 6 user stations. Often, applications run on a user station 16 will only require a single bit plane for such examples as wordprocessing or simple wire frame images. For example, it is possible on the present system for three of the user stations to be running applications requiring a single bit plane while the other three user stations are operating applications requiring 8 bit planes apiece. Another example is two single-plane users, two four-plane users, one six-plane user, and one user with double-buffered eight planes. It is of course not possible for all of the user stations to be using the maximum number of bit planes. The determination of which user gets how many bit planes is made by programming in the host computer, quite likely on a first-come, first-served basis. Thus, the present system is most useful in an environment where it is unlikely that all of the users will be employing bit plane intensive applications at the same time. In these environments the invention enables a number of users to have maximum bit plane availability on a system which is more economical by reason of use of shared bit planes.

Figure 2:
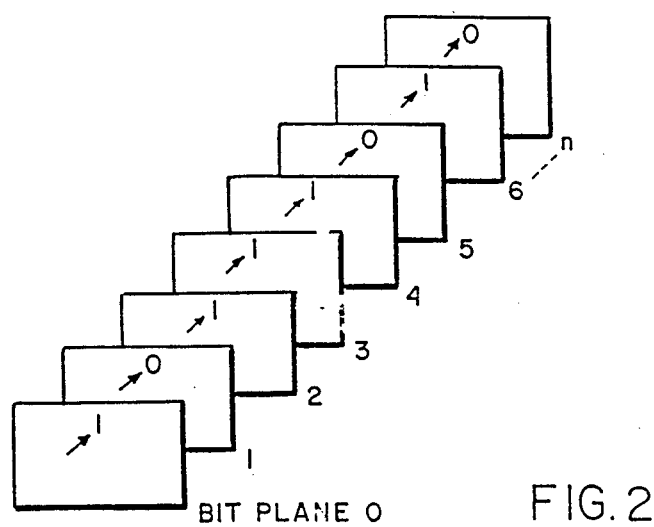
FIG. 2 is an illustration of a plurality of bit-planes including a representation of a superpixel.

Referring now to FIG. 2, a conceptual diagram of the bit planes is shown. The array of points stored in each bit plane corresponds to similarly located points on a display screen. The color and brightness of a pixel in a display are determined by the digital data stored at that location in the bit planes. If there is more than one bit plane assigned to a particular display, a pixel data word comprising each of the bits from a particular location in each of the assigned bit planes determines the brightness and color of that location. Thus, a monochrome display can be described in a single bit plane with one's and zero's. A color display would require a plurality of bit planes. The number of colors simultaneously available on a display would be equal to $2^n$ where n is the number of bit planes used by that display.

In accordance with the present invention, information is transferred from the bit-plane memory boards in raster scan fashion. Data are retrieved from the bit-plane memory boards as superpixels. A superpixel is a word including each of the data bits for a particular location on the bit-plane memory boards for all of the bit planes. In accordance with the presently preferred embodiment, there are 32 bit planes in a fully equipped system. In such a system, a superpixel would have 32 bits. The preferred embodiment transfers 4 superpixels at a time. Thus, the entire pixel data bus includes 128 lines to accommodate 4 superpixels of 32 bits each. The number of superpixels which are transferred at one time depends largely upon timing considerations. The preferred data bus has a 40 nanosecond transfer rate. By providing 4 superpixels per transfer the data bus is able to keep pace with the display systems which are able to deliver a pixel approximately every 10 nanoseconds. Each user station has hardware in a selector/driver board for receiving the superpixels and extracting from the superpixel the data bits which originated in the bit planes assigned to the particular user station.

Figure 3:
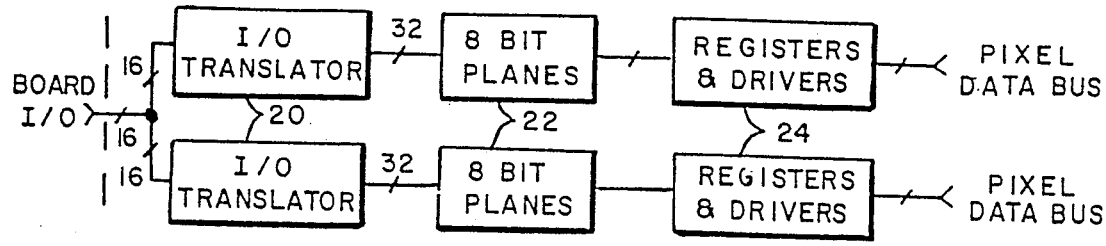
FIG. 3 is a schematic diagram of a bit-plane memory board from the system of FIG. 1.

The block diagram of a bit plane memory board is illustrated in FIG. 3. Writing data into the bit planes is done in a conventional manner. A 16 bit I/O line from the host computer into the bit-plane memory board feeds an I/O translator 20. One of ordinary skill in the art can select an appropriate I/O translator. The translator 20 can be comprised of 8 raster-op chips, or 8 pixel-op chips, or any other appropriate components known to those in the art. The I/O translator 20 provides 32 bits or 4 bits per plane to 8 bit planes 22. Registers and drivers 24 are well known in the art for use in scanning the bit planes and extracting the bits to form pixels for transfer over the pixel data bus 18. Each bit-plane memory board has two sets of 8 bit planes according to the presently preferred embodiment. Noteworthy here is that all bit planes are read simultaneously and synchronously, independent of their final user.

Figure 4:
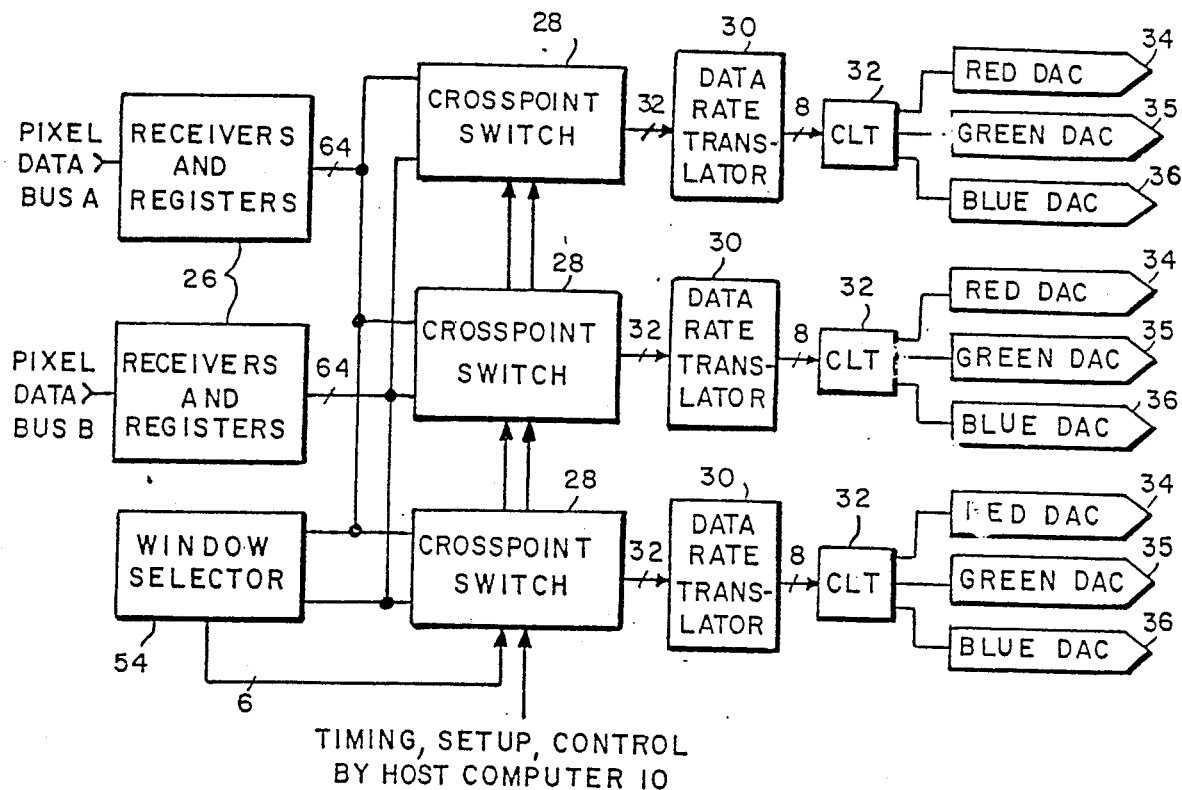
FIG. 4 is a schematic diagram of a selector/driver board from the system of FIG. 1.

Referring now to FIG. 4, each selector/driver board receives all 128 bits on the pixel data bus 18. Thus, 4 superpixels are transferred to each selector/driver board in each clock period. The selector/driver board is provided with receivers and registers 26 as are known in the art for interfacing with the pixel data bus. The receivers and registers 26 receive superpixels from the pixel data bus. In accordance with the preferred embodiment, half of each superpixel comes from the 16 bit planes on one bit-plane memory board over pixel data bus A and the other half comes from 16 bit planes on the bit-plane memory board over pixel data bus B. The two halves are separately received at the selector/driver board and are processed separately but in the same manner. This permits the flexibility of running this system with either one or two bit plane memory boards. Likewise, each selector/driver board operates independently of the other so that the system may run with one or two selector/driver boards.

Both halves of the superpixel are supplied to a crosspoint switch 28. A crosspoint switch is a circuit block that may connect any input to any output, or a plurality thereof, and can be implemented by one skilled in the art. There is a crosspoint switch 28 for each of the user stations 16 being serviced. The crosspoint switches 28 are controlled by the host computer 10. A control signal may also be provided to each crosspoint switch 28 by a window selector 54. Each crosspoint switch 28 is provided with an identification of which bit planes are associated with the user station being serviced by that particular crosspoint switch, and of their desired ordering. Thus, the output of the crosspoint switch provides, in the proper order, only the data bits from the bit planes assigned to the associated user station. The crosspoint switch 28 thus extracts from the superpixel, the pixel data word which is to be provided to the display circuitry of the associated user station. For example, the programming could translate superpixel bit 13 to the data word's least significant bit, superpixel bit 12 to the next significant bit, superpixel 14 to the third least significant, etc., depending on which bits and in which order bits have been assigned to the user station.

Since the presently preferred embodiment provides for 4 superpixels to each crosspoint switch, the output of a crosspoint switch is 4 pixel data words. The 4 data words are provided to a data rate translator 30. The data rate translator 30 uses well known circuitry generally including an ECL convertor and 8 4-bit shift registers to deliver each of the four data words, one at a time, sequentially to the display circuitry of the user station.

The display circuitry shown in FIG. 4 is conventional circuitry well known to those of ordinary skill in the art. Each pixel data word is fed into a color lookup table (CLT) 32 which translates the word into three brightness levels, one for each of the three primary colors. The brightness information for each color is transferred into a video digital to analog convertor (DAC). For each user station, there is a red DAC 34, a green DAC 35 and a blue DAC 36. The outputs of the DACs are provided to drivers for providing signals to the user station's display monitor.

Figure 5:
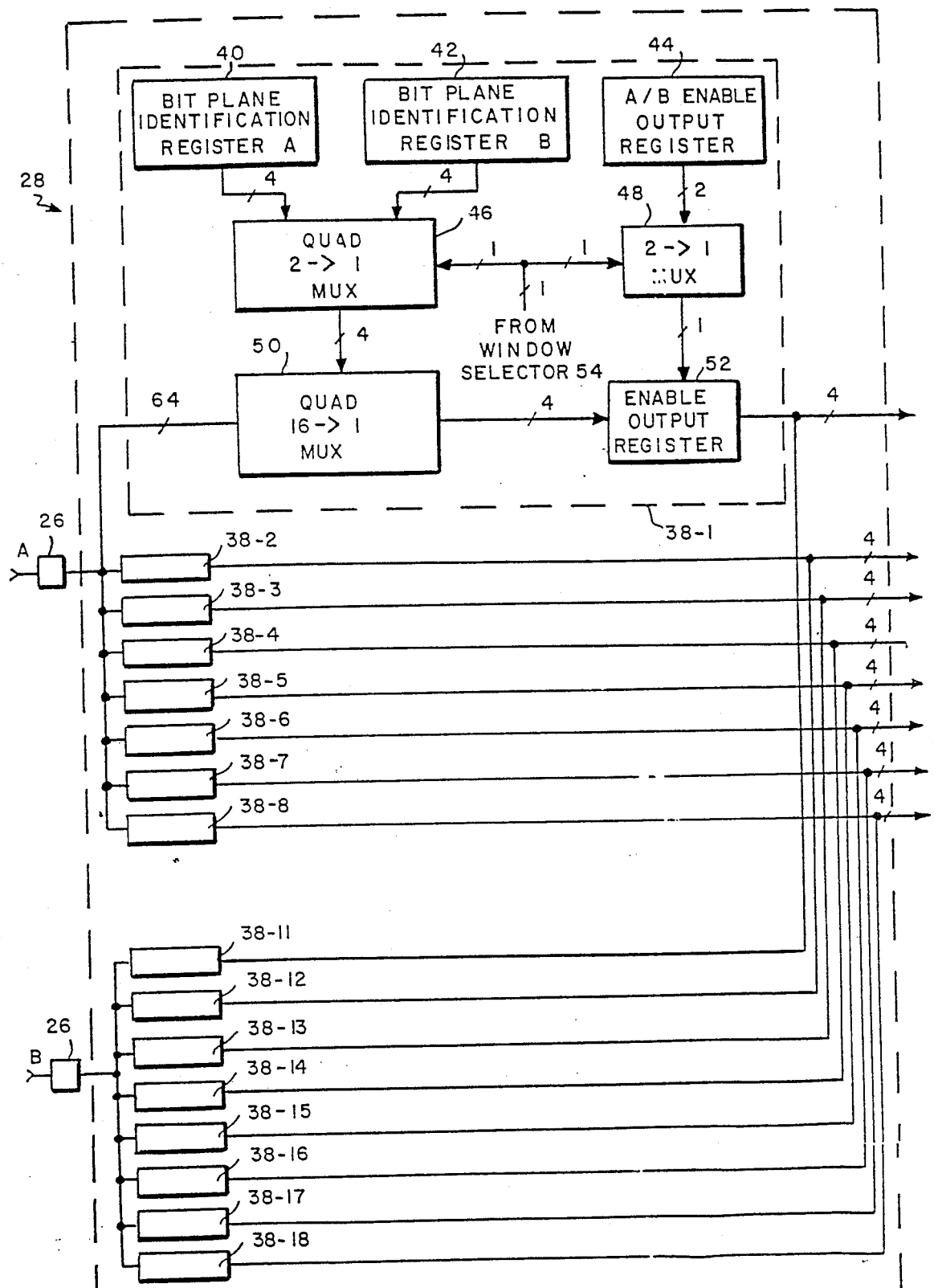
FIG. 5 is a schematic diagram of a crosspoint switch from the driver board of FIG. 4.

With reference to FIG. 5, the crosspoint switches 28 will be discussed in greater detail. Each crosspoint switch 28 in the presently preferred embodiment is divided into two halves, each receiving a different half of the superpixel. The receivers and registers 26 supply their one-half superpixel to each of the 8 selector circuits 38 in one of the crosspoint switch halves. It should be apparent that if there was only bit plane memory board being used then only one of the sets of receivers and registers 26 would be necessary and that set would be in effect providing an entire superpixel.

Each user station in the presently preferred embodiment can receive a pixel data word of up to 8 bits. Each bit in the pixel data word can come from either half of the superpixel. Therefore, an enable output register 52 is provided. The two halves of the crosspoint switch are paired up so that there are eight pairs of selector circuits. The enable output register 52 will only be on in one selector circuit in a pair. If fewer than eight bits are being used in the pixel data word of a user station than it is possible for the enable output registers in both selector circuits 38 of a pair to be off.

The selector circuits 38 receive the superpixels and provide the bit assigned to the bit plane identified for that particular selector circuit 38. Each selector circuit 38 is assigned a different bit plane whose associated bit is to be extracted from each superpixel. Since in accordance with the presently preferred embodiment, 4 superpixels are being transferred at a time, the output of each selector circuit 38 will be the 4 bits which came from its assigned bit plane.

Simple windowing may be provided by the system generating the bit planes. The set of bit planes being used by a display can be generated with a full screen picture that is interrupted and replaced in one or more windows by another picture. Animation can be provided by double buffering in which two sets of bit planes are viewed alternatively. Thus, while one set is viewed the other set is revised. Dynamic windowing essentially involves double buffering a window. Here, one set of bit planes generates a full screen picture with a second picture in a window. A second set of bit planes provides the alternate picture for the window, thus enabling dynamics or double buffering of the window. The remainder of the full screen need not be used in the second set of bit planes according to the present invention. The full screen portion of the first set can be viewed with the window of the second set.

If dynamic windowing or double buffering is used it is thus possible for 16 bit planes to be assigned to a user station. In this case only 8 bit planes will be used for any pixel, although with dynamic windowing all 16 may be used during a complete screen display. In order to provide dynamic windowing or double buffering, each selector circuit 38 may be provided with 2 bit plane identification registers, register A 40 and register B 42. The bit plane identification registers 40 and 42 each contain 4 bits for identifying a bit plane assigned to the selector circuit 38.

A window selector 54 reads an assigned window identifier bit plane to provide a bit which identifies the bit plane identification register that should be used for each set of four pixels. The 1's and 0's in the window identifier bit plane determine where a window is located for a given display. For example, 0's may identify the full screen areas while the 1's identify the dynamic window. The window selector 54 reads the bit plane and sends a signal to the appropriate crosspoints 28 indicating whether the pixel data word should be determined by bit plane identification register A or register B. This enables the use of dynamic windowing in which the bit planes sourcing the display are switched in the middle of a scan so as to get the window from a set of bit planes that is different from the bit planes sourcing the remainder of the screen.

The window selector 54 is a crosspoint switch and thus its design can be similar to that of the crosspoint switch 28 of FIG. 5. The window selector 54 has six output bits, one for each half of each of the three crosspoint switches 28. Six selector circuits resembling selector circuits 38 can provide the six output bits. Only one bit plane identification register is needed in each selector circuit of the window selector 54 to identify the window identifier bit plane associated with a particular user station.

Referring back to FIG. 5, a 2-to-1 quad multiplexor 46 receives the bit plane identification bits from the identification registers and outputs the identity of the appropriate bit plane in response to the signal from the window selector 54. A 16-to-1 quad multiplexor 50 receives the bit plane identity from the 2-to-1 quad multiplexor 46 and selects out the bit from each of the four superpixels which originated from the identified bit plane.

Since each selector circuit 38 receives only half of the superpixel, only one in a pair of selector circuits 38 will be enabled at its enable output register 52. The selector circuit 38 which is enabled may depend on whether the A or the B identification register is being used. Therefore, an A/B enable output register 44 is provided for indicating enablement in each of the two cases—when register A is used and when register B is used. The A/B enable output register 44, thus, has two bits one corresponding to register A and one corresponding to register B. These enable bits are provided to a 2-to-1 multiplexor 48. The 2-to-1 multiplexor 48 also receives the signal from the window selector 54 to identify whether register A or register B is being used. Then the corresponding enable bit is provided to the enable output register 52.

For a monochrome display it is possible that only a single bit plane is being used by the user station in which case 15 of the selector circuits 38 will be disabled and only a single selector 38 will be enabled for providing bit information out from the crosspoint switch 28.

The computer host 10 in filling the bit plane identification registers and A/B enable output registers can assign the bit planes to a user station in any order. The order of the bit planes is achieved by the order in which the bit planes are assigned to the selector circuits 38. The first bit of a pixel data word will come from selector circuit 38-1 or 38-11. Only one of these two selector circuits will be enabled. Thus, according to the presently preferred embodiment 4 superpixels are input into a crosspoint switch and 4 pixel data words of 8 bits each are output from the switch. The 8 bit pixel data words are provided in the assigned sequence. In this manner, the 8 bit pixel data word can be properly interpreted by the color lookup table for the appropriate user station. When fewer than 8 bit planes are assigned to the user station, the unused bits will be effectively zeroed so that they do not have an effect on the color selection for the pixel.

The present invention advantageously permits a plurality of user stations to have full color capability available without providing the maximum bit planes to each of the user stations. The invention further provides an easy mechanism for double buffering to allow for animation within a window.

Of course, it should be understood that various changes and modifications to the preferred embodiment described above will be apparent to those skilled in the art. For example, there are a number of different designs that one could use for the crosspoint switch. It is also possible to use additional bit plane identification registers for multiple buffering. These and other changes can be made without departing from the spirit and the scope of the invention and without diminishing its attendant advantages. It is therefore intended that such changes and modifications be covered by the following claims.

I claim:

1. A display system for a plurality of user stations comprising:
    memory means for storing a plurality of bit planes;
    means for retrieving a superpixel from said bit planes, said superpixel comprising a bit from the same pixel location in each bit plane of said plurality of bit planes; and
    switching means associated with each user station for receiving said superpixel and for providing its associated user station with a data word, each switching means having first bit plane identification means for identifying which one or more of said plurality of bit planes is assigned to the associated user station such that said data word is comprised of the bits in said superpixel from said one or more bit planes assigned to said associated user station.

2. The display system of claim 1 wherein at least one of said switching means further comprises a second bit plane identification means for identifying a second one or more of said plurality of bit planes which is assigned to the associated user station and window selector means for selecting one of said first or second bit plane identification means for use by said switching means in determining said data word.

3. The display system of claim 2 wherein said window selector means reads a bit plane from said memory means, said bit plane determining the selection of said first or second bit plane identification means.

4. The display system of claim 1 further comprising a high speed data bus for transporting said superpixel from said retrieving means and interface means for removing said superpixel from said data bus and providing it to each of said switching means.

5. The display system of claim 4 wherein four superpixels are transported over said data bus at one time and each of said switching means provides four data words extracted from said four superpixels.

6. The display system of claim 1 wherein the number of bit planes in said plurality of bit planes is less than the product obtained by multiplying the number of user stations times the largest number of bit planes assigned to any one of said user stations.

7. The display system of claim 1 wherein said switching means comprises two switches, each switch receiving a different half of each superpixel.

8. The display system of claim 7 wherein said switching means have enable output registers, one associated with each of said two switches, said two enable output registers operating so that no more than one is enabled at a time for each output bit plane.

9. A method for sharing bit planes among a plurality of user stations comprising:
    transmitting a plurality of superpixels each containing a bit from the same pixel location in each bit plane of a plurality of bit planes;
    assigning a first set of bit planes from among said plurality of bit planes to each user station; and
    extracting for each user station the bits assigned to said user station from each of said superpixels.

10. The method of claim 9 further comprising the steps of:
    assigning a second set of bit planes to at least one of said user stations, and
    selecting one of said first and second sets of bit planes for said at least one of said user stations before said step of extracting bits.

11. The method of claim 9 further comprising the steps of:
    assigning a second set of bit planes to at least one of said user stations, and
    switching between said first set of bit planes and said second set of bit planes in the middle of performing said step of extracting bits so as to display a window at said at least one of said user stations.

* * * * *